United States Patent

[11] 3,597,544

[72] Inventor James B. Kennedy
Bexley, Ohio

[21] Appl. No. 816,997
[22] Filed Apr. 17, 1969
[45] Patented Aug. 3, 1971
[73] Assignee Bell Telephone Laboratories, Incorporated
Murray Hill, N.J.

[54] DATA SWITCHING SYSTEM
10 Claims, 9 Drawing Figs.

[52] U.S. Cl. .......... 179/2, 340/172.5, 179/18
[51] Int. Cl. .......... H04m 11/00, H04q 3/42
[50] Field of Search .......... 179/2 DP, 2 R, 6 R, 2, 1 CN, 179, 3, 4; 340/172.5, 151

[56] References Cited

UNITED STATES PATENTS

| | | | |
|---|---|---|---|
| 3,441,678 | 4/1969 | Budlong .......... | 179/18 |
| 3,335,226 | 8/1967 | Michael et al. .......... | 179/2 |

*Primary Examiner*—William C. Cooper
*Assistant Examiner*—Tom D'Amico
*Attorneys*—R. J. Guenther and James Warren Falk

ABSTRACT: A switching network for data stations is disclosed. Data stations are served by switching centers capable of interconnecting the data stations via wide band facilities. Connections between selected data stations can be "ordered up" from any conventional telephone station not associated with the data stations. The customer desiring to interconnect data stations originates a telephone call which, as it progresses through the network, prepares each switching center for interconnecting the selected data stations.

INVENTOR
J. B. KENNEDY
BY Charles F. Davis
ATTORNEY

PATENTED AUG 3 1971 3,597,544

SHEET 2 OF 8

PART OF DATA LINE CIRCUIT

DATA SWITCHING SYSTEM

BACKGROUND OF THE INVENTION

This invention relates to communications networks and particularly to networks for transmitting intelligence both within and without the voice frequency spectrum. In a more particular aspect, this invention relates to improved arrangements for interconnecting wide band data stations under the control of voice frequency telephone stations. In a still more particular aspect, this invention relates to arrangements whereby a customer at any telephone station can order the interconnection of data stations to permit the data stations to intercommunicate.

Accompanying the increased use of high-speed data processing machines, the need arises for interconnecting remotely located data stations to facilitate the exchange of large quantities of data between the data processors. Under circumstances whereby two data stations always intercommunicate with each other, high-quality wide band facilities can be provided on a point-to-point basis to directly interconnect the data processors. Of course, this arrangement lacks flexibility in that no facilities are provided for switching in additional data stations as the need arises for communication with other data processors.

To solve the problem of selectively interconnecting many data stations, arrangements have been proposed using the existing switching techniques found in telephone switching systems. In one such system, the work data network is directly controlled by the voice network. More specifically, each data station is connected to a wide band switching network and each data station has a telephone station associated therewith. The telephone stations are connected to a local telephone switching office which directly controls the data network. Thus, to interconnect two data stations, one must go to the telephone station associated with one of the data stations and originate a telephone call to the telephone station associated with the other data station.

The obvious disadvantage of this system is that the party originating the call must have access to the telephone station associated with at least one of the data stations. Also, each data station must have a telephone station associated with it even though there may be no necessity for voice communications between the customers at the data stations.

Furthermore, since the data network is controlled directly by the local telephone office, each local office must be equipped with wide band switching facilities even if the local office serves only a single wide band data station.

SUMMARY OF THE INVENTION

In accordance with the one illustrative embodiment of the invention, data stations are connected directly to centrally located switching offices which are capable of switching wide band data facilities. Each data station is assigned a data station code and an enabling code and the switching offices contain memory stores for temporarily storing call processing data relating to the establishment of data connections. Connections between data stations can be "ordered up" from any local telephone station.

To order a connection between two data stations, the customer at a local office originates a telephone call by dialing a "data call code" followed by the data station codes of the originating and terminating data sets that are to be interconnected. The telephone call is forwarded to the nearest wide band office which serves data stations and a determination is made as to whether one or both data stations are served by that office. If one of the data stations is served by that office, that station is reserved and the telephone call is forwarded to the wide band switching office serving the other data station. As the telephone call is forwarded through each switching office in the network, routing information for enabling the subsequent data connection is stored in memory.

At the wide band switching office serving the second data station, that station is tested for a busy condition. If the station is found busy, a "cannot execute" signal will be returned over the telephone connection to the customer who ordered up the data connection and the entries in memory at the various switching offices will be erased. If the data station is idle, it will be reserved and a "can execute" signal will be returned over the telephone line to the customer who ordered up the data connection, indicating to that customer that the data connection will be set up as ordered.

The "can execute" signal is also detected at the switching office of the first data station and causes that data station to outpulse its enabling code. The enabling code is recognized at the originating switching office and other switching offices involved in the connection. This enabling code is used to retrieve the data connection routing information that was stored in these offices when the ordering telephone connection was established. When the data connection is established, supervisory signals are exchanged between the data stations and the release of the wide band connection is placed under control of the data stations.

BRIEF DESCRIPTION OF THE DRAWING

A better understanding of the arrangement contemplated will be had by the following description of the illustrative embodiment of the invention made with respect to the drawing, in which.

GENERAL DESCRIPTION

Before describing the arrangement in detail, a brief description will be given with reference to the block diagram shown in FIGS. 1 and 2.

Figure 1:
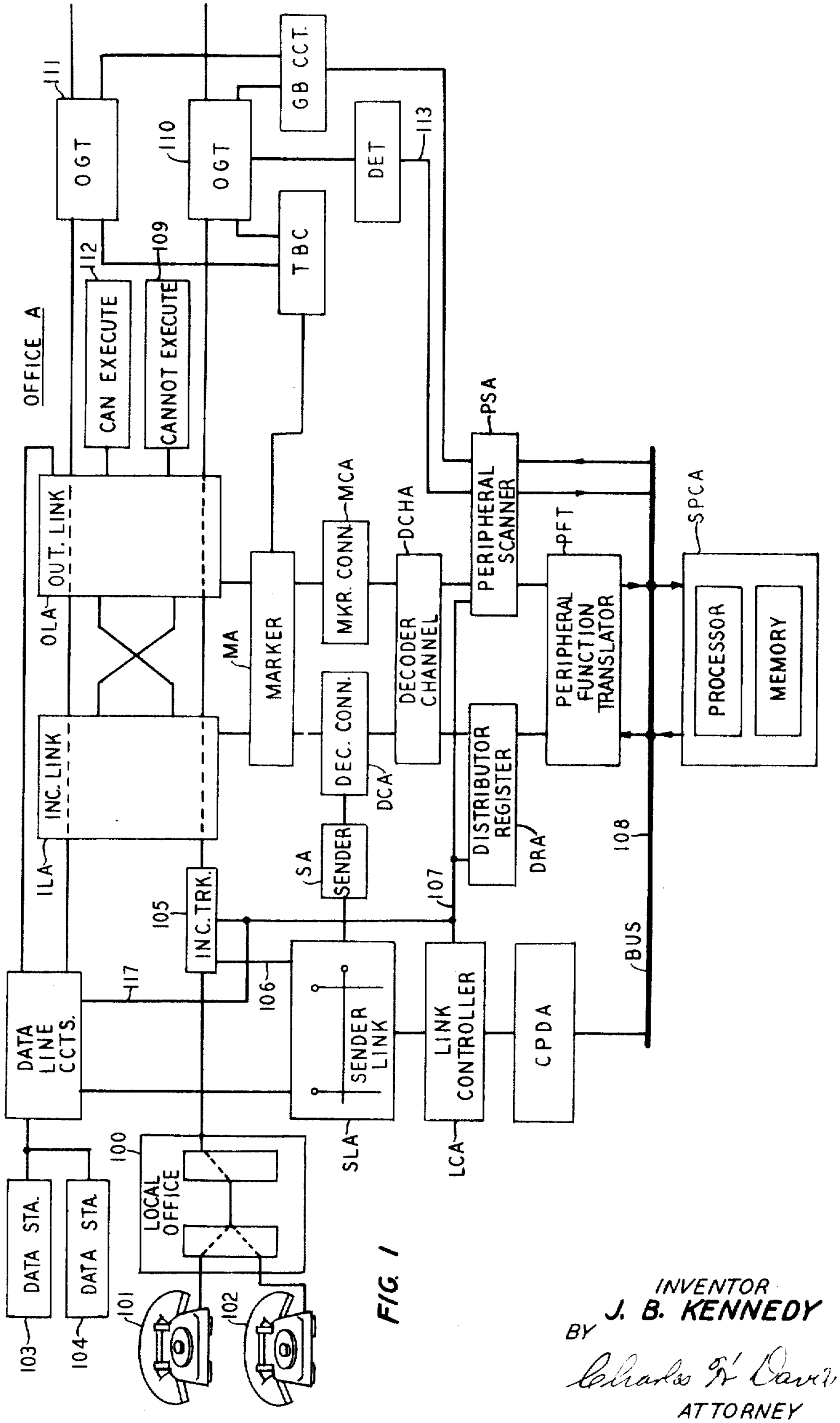
FIGS. 1 and 2 show, in block diagram form, a typical four-wire telephone network in which wide band switching facilities can be ordered up between data stations under the control of a local telephone station.
Figure 2:
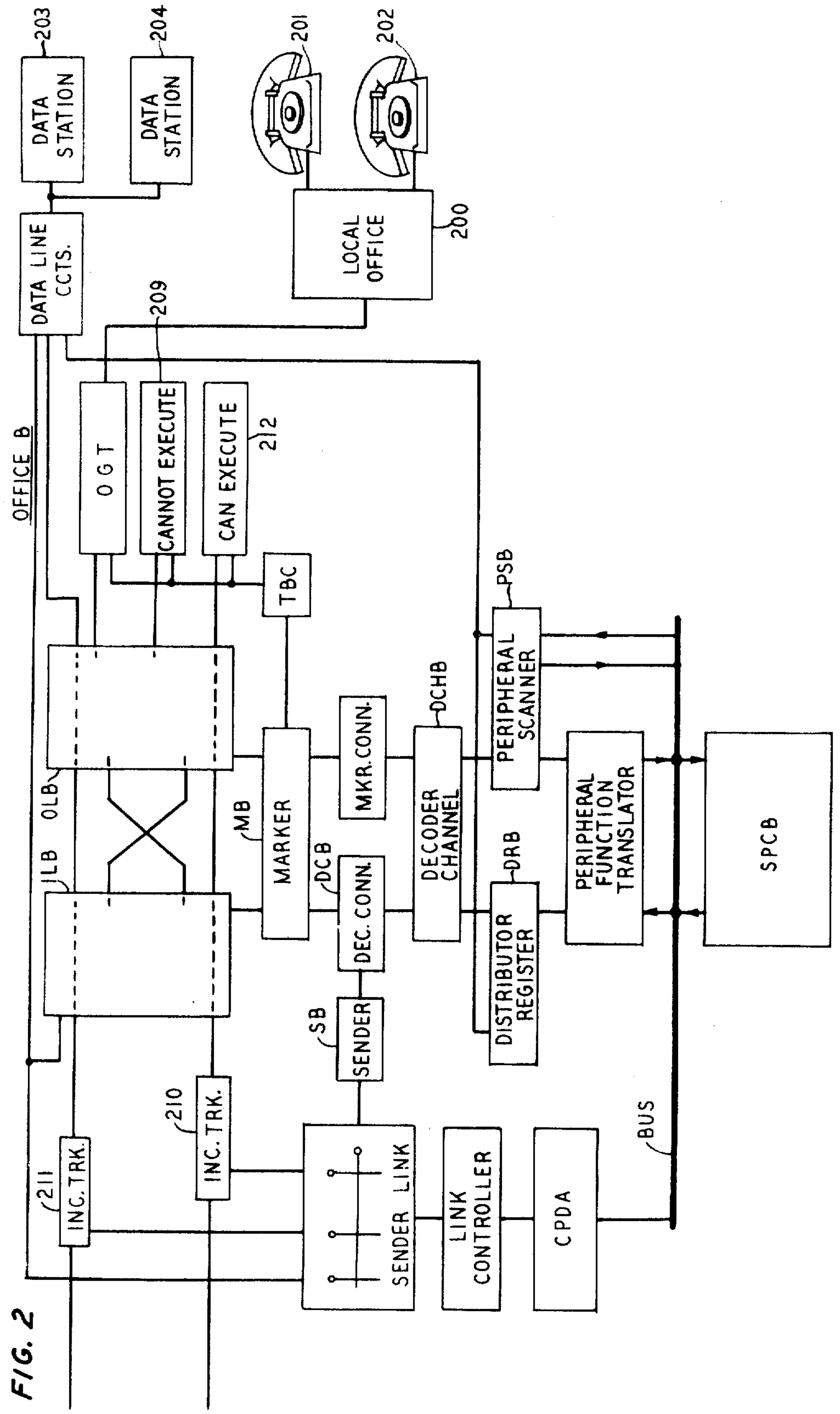

FIGS. 1 and 2, when arranged with FIG. 2 to the right of FIG. 1, show part of a typical telephone network comprising two four-wire switching offices designated A and B and local central offices 100 and 200. Switching offices A and B can be any type of switching office capable of interconnecting circuits over high grade transmission facilities. One such office is disclosed in U.S. Pat. No. 2,868,884 to J. W. Gooderham et al. of Jan. 13, 1959 and in the copending application of C. J. Funk et al. Ser. No. 784,615, filed Dec. 18, 1968.

Local offices 100 and 200 which serve customer telephone stations, such as 101, 102, 201 and 202 comprise one of the many more familiar types of switching systems. An example of such a system is the crossbar system disclosed in U.S. Pat. No. 2,585,904 to A. J. Busch of Feb. 19, 1952.

Offices A and B are sometimes referred to as toll switching centers since they are used for establishing high-grade trunk-to-trunk connections between remotely located local offices. In accordance with one feature of the invention, data stations are also connected directly to the toll switching offices, such as offices A and B.

Since the switching equipments of offices A and B are assumed to be identical, only office A will be described. Office A comprises incoming link frames ILA on which incoming trunks are terminated and outgoing link frames OLA on which outgoing trunks are terminated. Office A also serves data stations, such as stations 103 and 104, which are connected through data line circuits to both incoming and outgoing like frames to facilitate the establishment of originating and terminating calls to the data stations. When the term "data station" is used herein it is understood to include different types of stations such as facsimile, video, data processors, etc.

To control the establishment of connections between trunks and data stations, office A also comprises various units of common control equipment, such as marker MA, sender SA, data processor SPCA, et cetera, as shown in FIG. 1.

To illustrate how the system operates, a call will be described wherein a customer at local telephone station 101 orders up a wide band connection between data station 103 served by office A and data station 203 served by office B.

To order up the connection, the customer at station 101 lifts his receiver and is connected to a register circuit at local office 100. The register (not shown) returns dial tone to the customer at station 101, whereupon the customer transmits the proper digital information to local office 100 using a dial or keyset.

The digital information necessary to order up a data call comprises a data call code and a code associated with each data set to be connected. For purposes of discussion, the codes associated with the data stations will be referred to as "originating data station code" and "terminating data station code." It will be realized that the terms "originating" and "terminating" as used with reference to the data stations do not necessarily denote the direction in which the data connection will be established, but are merely used to distinguish between the data stations.

Let is be assumed that the data call code is made up of the three digits 511 and the code assigned to the data stations 103 and 203 are the three digit codes 103 and 203, respectively. Therefore, the customer at telephone station 101 dials 511–103–to order up the wide band connection between data stations 103 and 203. The equipment at local central office 100 responds by establishing a connection to the nearest toll switching center, office A, and pulses forward the nine digits received from the customer at station 101.

When a trunk is seized at local office 100, the corresponding incoming trunk equipment 105 at toll office A transmits a bid signal over conductors 106 to request connection to a sender via sender link frame SLA. In response to the bid for a sender, link controller LCA signals over conductors 107 to saturate a sensing device in peripheral scanner PSA. Peripheral scanner PSA functions as an input buffer to transmit information from certain control equipment units to the electronic data processor SPCA. One scanner suitable for use in our invention is disclosed in U.S. Pat. No. 3,254,157 to A. N. Guercio et al. of May 31, 1966.

During this stage of the call, data processor SPCA stores in its memory the incoming trunk identity and the identity of the sender being used on the call. The data processor SPCA then signals over conductors 108 to central pulse distributor applique circuit CPDA to have link controller LCA interconnect the incoming trunk 105 with selected sender SA.

Once the sender SA is connected to the trunk, the digits 511–103–can be outpulsed from local office 100 and stored in the sender. When the sender receives sufficient digits, it seizes an idle decoder channel DCHA through decoder connector DCA and forwards the digital information to the decoder channel. Decoder channel DCHA then signals the data processor that it is ready for a route translation by saturating sensing devices in the peripheral scanner PSA.

Data processor SPCA is a stored program controlled facility which performs certain functions, such as route translation, for processing calls at office A. The processor is controlled by a stored program which periodically directs scanner PSA to look for translation requests from decoder channels. Recognizing a translation request from decoder channel DCHA, the processor reads sensing devices associated with the information stored in the decoder channel pertaining to the call being described. This information contains the identity of the sender being used on the call and the nine digits outpulsed from local office 100. Using the sender identity, the processor can recapture from memory the identity of the incoming trunk 105 which is connected to the sender.

The processor now examines the nine digits received by sender SA. The first three digits 511 are recognized by the processor as a data code call and the processor must now ascertain the location in the network of the two data stations to be connected. The processor examines the next three digits 103 which represent the originating data station and consults a table in memory to determine whether the data station assigned to that code is served by office A. Upon finding that the originating data station is served by office A, the processor directs peripheral scanner PSA to scan a sensing device associated with the data station to determine whether the data station is busy or idle. If the data station is busy, the incoming trunk 105 is connected to a tone trunk 109 indicating that the connection ordered up by telephone station 101 cannot be executed.

Assuming that the originating data station 103 is idle, a line circuit associated therewith is marked "reserved" to prevent the data station from being seized by another data call.

The processor now examines the terminating data station code which comprises the last three digits 203 received by sender SA. By consulting its memory store, the processor determines if the terminating data station is served by office A or some other remote switching office.

In the example being described, the processor determines from its memory that the terminating data station 203 is served by switching office B and the processor also determines the routing index for data calls to office B. From the routing index, the processor can consult various trunk tables in memory to learn the equipment location of the wide band trunks in the appropriate trunk routes to office B.

The processor then tests these trunks to determine if idle trunks are available. All of the data trunks outgoing from office A will be tested at this time, A connection will not be established to a data trunk until it is ascertained that the terminating data station is idle and that trunks are available in the routes between all offices necessary to complete the call. To ensure the availability of data trunks when the data connection is to be established subsequently, the processor can do one of many things. For example, the processor might reserve an idle trunk, thus preventing its seizure for another call. The identity of the reserved trunk would be put in memory associated with this data call and the trunk would be seized when the data connection is established. In the alternative, the processor might not reserve a specific trunk but determine how many trunks are idle. If the number of idle trunks exceeds a predetermined amount, this would indicate that a data trunk will be available when the data connection is to be established.

When the processor determines that a data trunk is available, it begins processing the voice call. This entails selecting a voice trunk from office A to office B. Depending upon the trunk requirements and the arrangement of trunks in the network, the trunk used for the voice call may be selected from the same group used for interconnecting the data stations. On the other hand, the voice call may be extended over an entirely different route to the office on the terminating data station. In the example being described, it will be assumed that the trunk group, including outgoing trunk 111, will be used for the data connection while outgoing trunk 110 has been selected for the voice connection.

Data processor SPCA also converts the three-digit data call code 511 into a data progress code 611 for outpulsing to the succeeding offices. The data progress code indicates to each succeeding office that one of the data stations has been found idle and has been reserved and that data trunks should be tested for availability. With the arrangement contemplated, it is possible for the telephone call which orders up the data connection to be extended through several switching offices before reaching a switching office serving one of the data stations. Under these circumstances, a three-digit data call code 511 is pulsed forward to each office until an office serving one of the data stations is found. Recognizing the data call code, the control equipment in each switching office will not attempt to select a data trunk facility to the next office, whereas if the data progress code 611 is received, the control equipment will attempt to select a data trunk for extending the data connection.

From its memory, the processor also determines the enabling code for the originating data station. This enabling code will be outpulsed automatically by the originating data station line circuit if the data connection which has been ordered up can be completed. For purposes of discussion, it will be assumed that the enabling code for station 103 comprises the three digits 163. The processor nor enters, in a section of its memory associated with the originating data station, the three-digit code of the terminating data station along with the route index of the selected data trunk route and any other information necessary to process the data call when the originating data station initiates a call by outpulsing its enabling code.

When outgoing trunk 110 is seized, a channel on incoming and outgoing link frames ILA and OLA is selected and incoming trunk 105 is connected to outgoing trunk 110 over the channel. As soon as sender SB at office B is attached to the incoming trunk equipment 210, sender SA can outpulse the information stored therein over the trunk to office B. This information comprises the three-digit data progress code 611, the three-digit code 203 assigned to the terminating data station, and the enabling code 163 for the originating data station 103.

The operation of the control equipment at office B is substantially the same as described above with respect to office A. Sender SB selects an idle decoder channel DCHB via decoder connector DCB and decoder channel DCHB bids for a translation via peripheral scanner PSB. Data processor SPCB directs scanner PSB to examine the information-sensing devices associated with the decoder channel DCHB. This prevents the data processor SPCB with the nine digits received from office A by sender SB.

Data processor SPCB recognizes the three-digit data progress code 611 and consults its memory store and determines that the terminating data station 203 is served by office B. From its memory, the processor determines the scanner location of the terminating data station 203 and examines a sensing device therein to determine if the terminating data station is busy or idle. If the terminating data station 203 is busy, the connection is extended to a "cannot execute" trunk which returns a tone to the calling customer at telephone station 101 indicating that the data connection cannot be ordered up. On the other hand, if the terminating data station is idle, a "reserve" mark is placed in memory to prevent the terminating data station from being seized by another data call.

The processor now makes an entry in its memory indicating that, when the enabling code 163 is received over an incoming data trunk, the data trunk should be connected to data station 203.

Having recorded this information in memory, the data processor SPCB distributes information to decoder channel DCHB and marker MB telling the marker to interconnect the incoming voice grade trunk 210 to a "can execute" tone trunk. Tone is transmitted from this trunk back over the connection to the calling customer at station 101 informing him that the data connection that he ordered up can be executed. The customer can now replace his receiver, thereby releasing the telephone connection. Before the telephone connection is released, however, the tone transmitted by trunk 212 is detected by detector 113 associated with outgoing trunk 110. Detector 113 actuates a sensing device in peripheral scanner PSA.

Processor SPCA recognizes the actuation of a sensing device associated with one of the detectors and from its memory ascertains the identity of the originating data station involved in the call. The processor nor addresses distributor register DRA which signals over conductors 107 and 117 to the data line circuit associated with data station 103. Each data line circuit is equipped with apparatus for transmitting a special enabling code corresponding to its associated data station. Distributor register DRA causes the data line circuit associated with data station 103 to bid for a sender SA via sender link SLA. When the sender is attached to the data line circuit, the line circuit outpulses the enabling code 163 associated with data station 103.

The stored program control system SPCA processes this call similar to an incoming call by translating the digits 163. The digits 163 cause the processor to consult its memory to determine the routing of the call. It will be recalled that when the telephone connection was established, the processor stored in memory associated with the code 163, the route index and other information necessary for processing the data call. The processor then tests individual trunk groups in the route and selects a group having an idle trunk. Having selected an idle trunk group, the processor directs marker MA to interconnect data station 103 to a trunk in that group, such as data trunk 111, over a channel on incoming and outgoing links ILA and OLA.

After the channel has been established, data processor SPCA transmits to sender SA the information to be outpulsed to office B, and sender SA outpulses the enabling code 163 of the originating data station. When outgoing data trunk 111 was seized, its corresponding incoming trunk equipment 211 at office B was connected to a sender, such as SB, in the usual manner. The sender at office B therefore receives the enabling code outpulsed by the code generator of the originating data station 103.

At office B the enabling code is used by processor SPCB to ascertain from its memory the location of the terminating data station to be connected to the incoming trunk over which the enabling code was received. A channel is then established on the incoming and outgoing links ILB and OLB between incoming trunk equipment 211 and data station 203. Supervisory signals are exchanged between data stations 103 and 203 and data now can be transmitted between the two stations. The data trunk connection between these two stations is automatically released when both stations have finished their exchange of information and disconnected from the connection.

While the above-described call involved adjacent switching offices, it will be obvious to those skilled in the art that connections can be ordered up between data stations that are separated by one or more intermediate switching centers. Under these circumstances, the intermediate switching centers upon receipt of the data progress code 611, the terminating data station code 203, and the originating data station identifying code 163 examine data trunks in the appropriate routes to the terminating data station. The route index information, the terminating data station code, and the originating data station identifying code are stored in memory at each intermediate switching center for subsequent use. When the originating data station identifying code is received over one of the incoming trunks at an intermediate switching center, this information is recaptured from memory and an outgoing data trunk from that office is seized and connected to the incoming data trunk over which the originating data station identifying code was received.

DETAILED DESCRIPTION

Turning now to FIGS. 3—8, a more detailed description of the invention will now be given. FIGS. 3—8 when arranged according to FIG. 9 show in more detail the same embodiment of the invention depicted in the block diagram of FIGS. 1 and 2.

Figure 3:
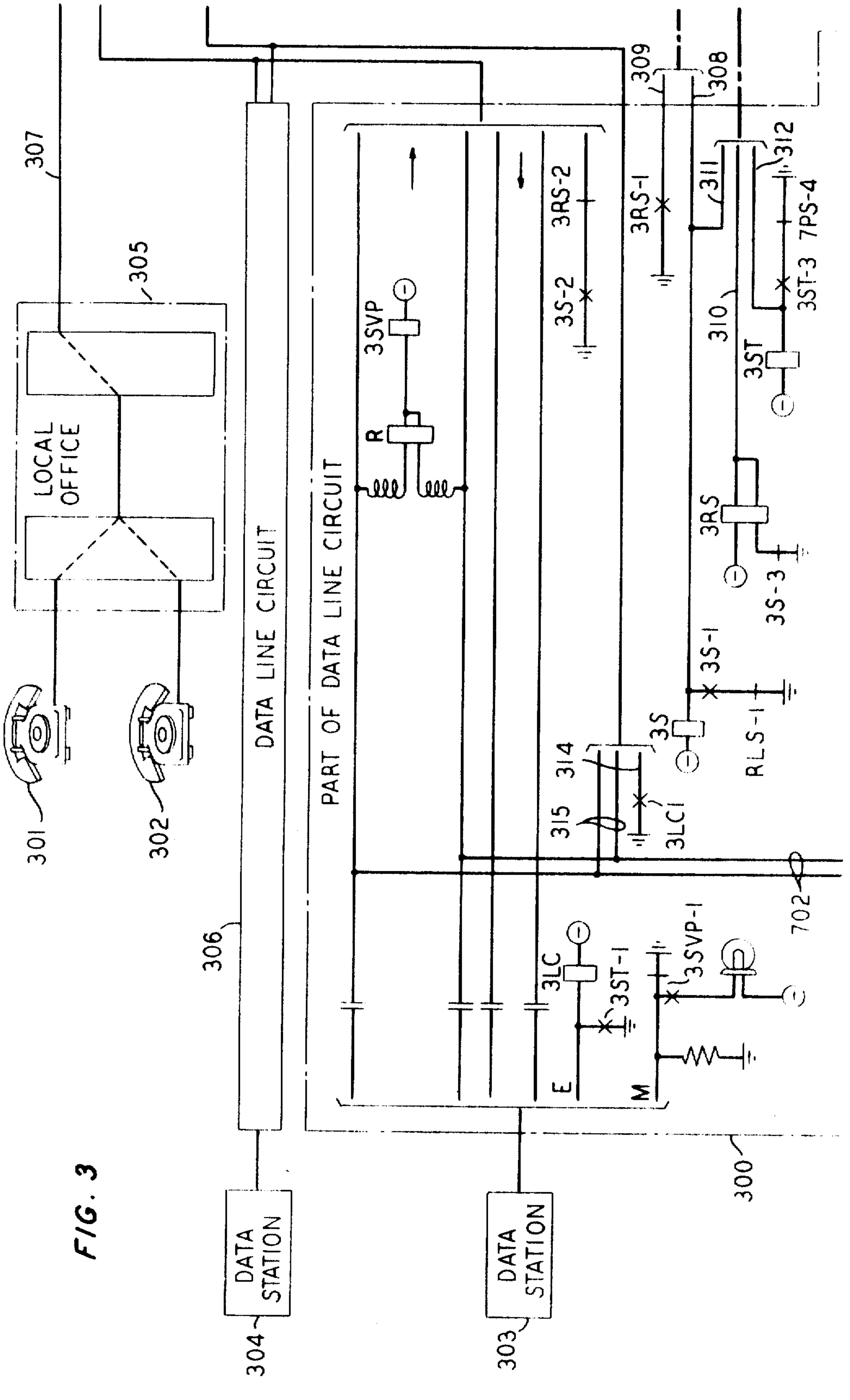
FIGS. 3—8, when arranged in accordance with FIG. 9, show a more detailed disclosure of the same embodiment of the invention.
Figure 4:
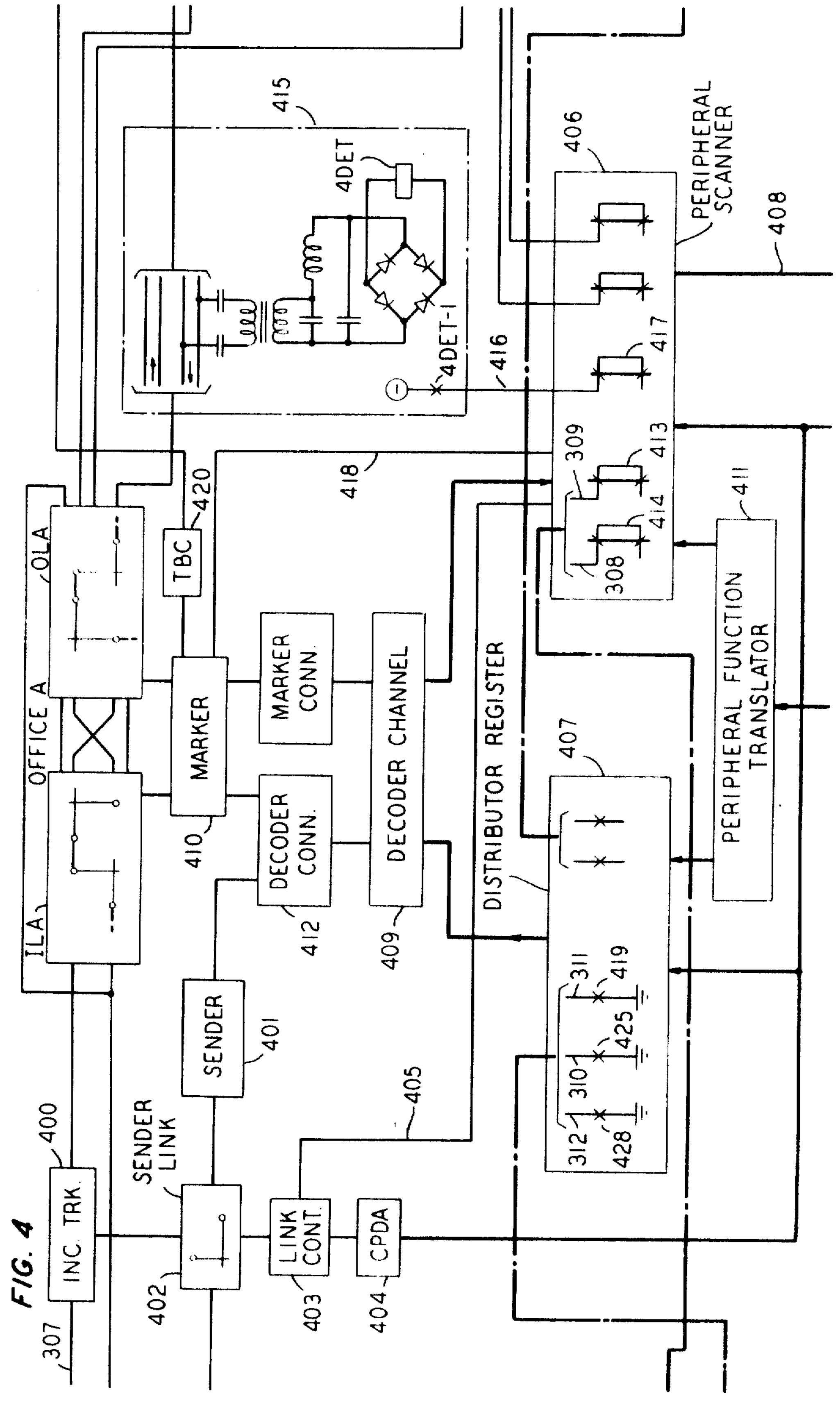
Figure 5:
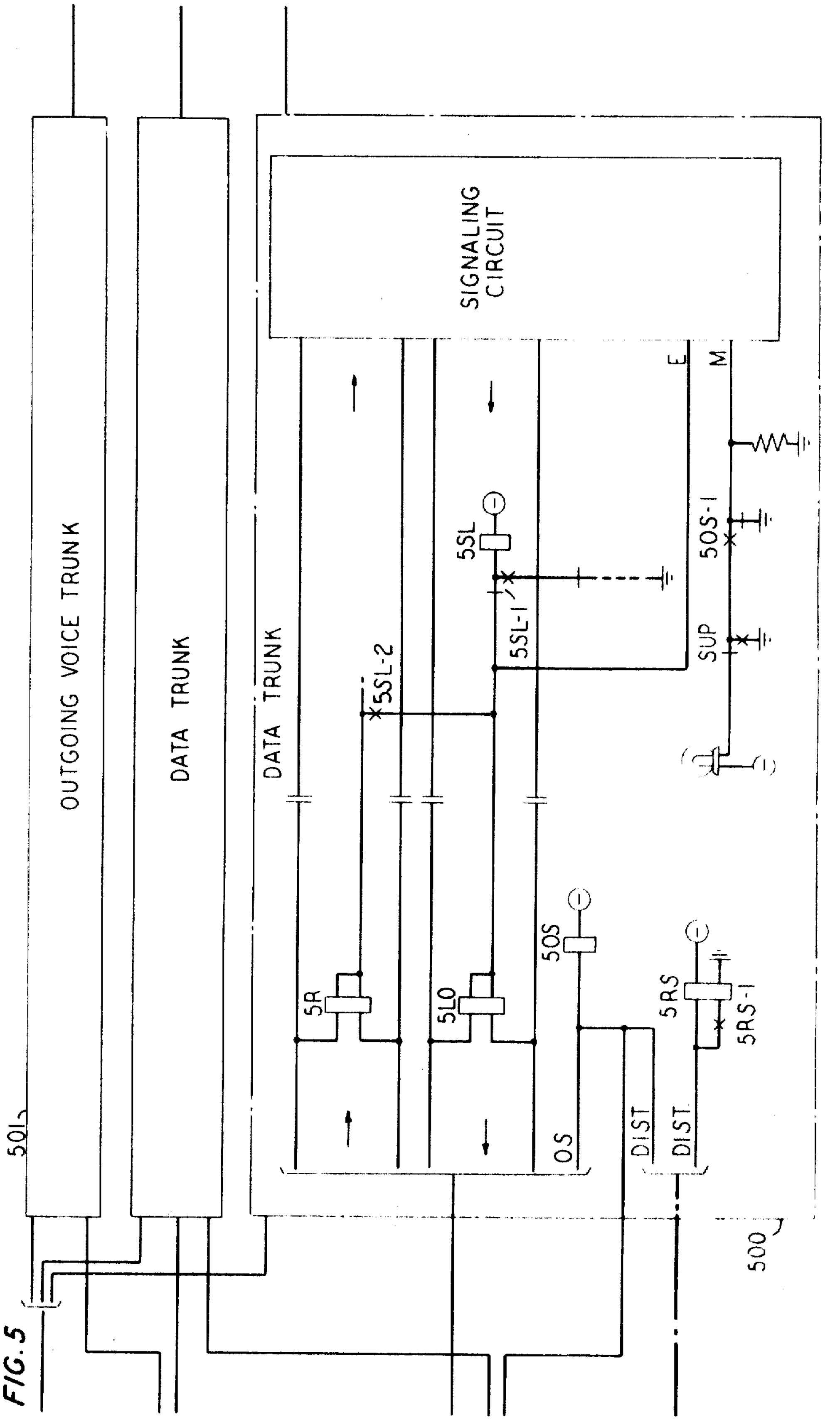
Figures 6, 9:
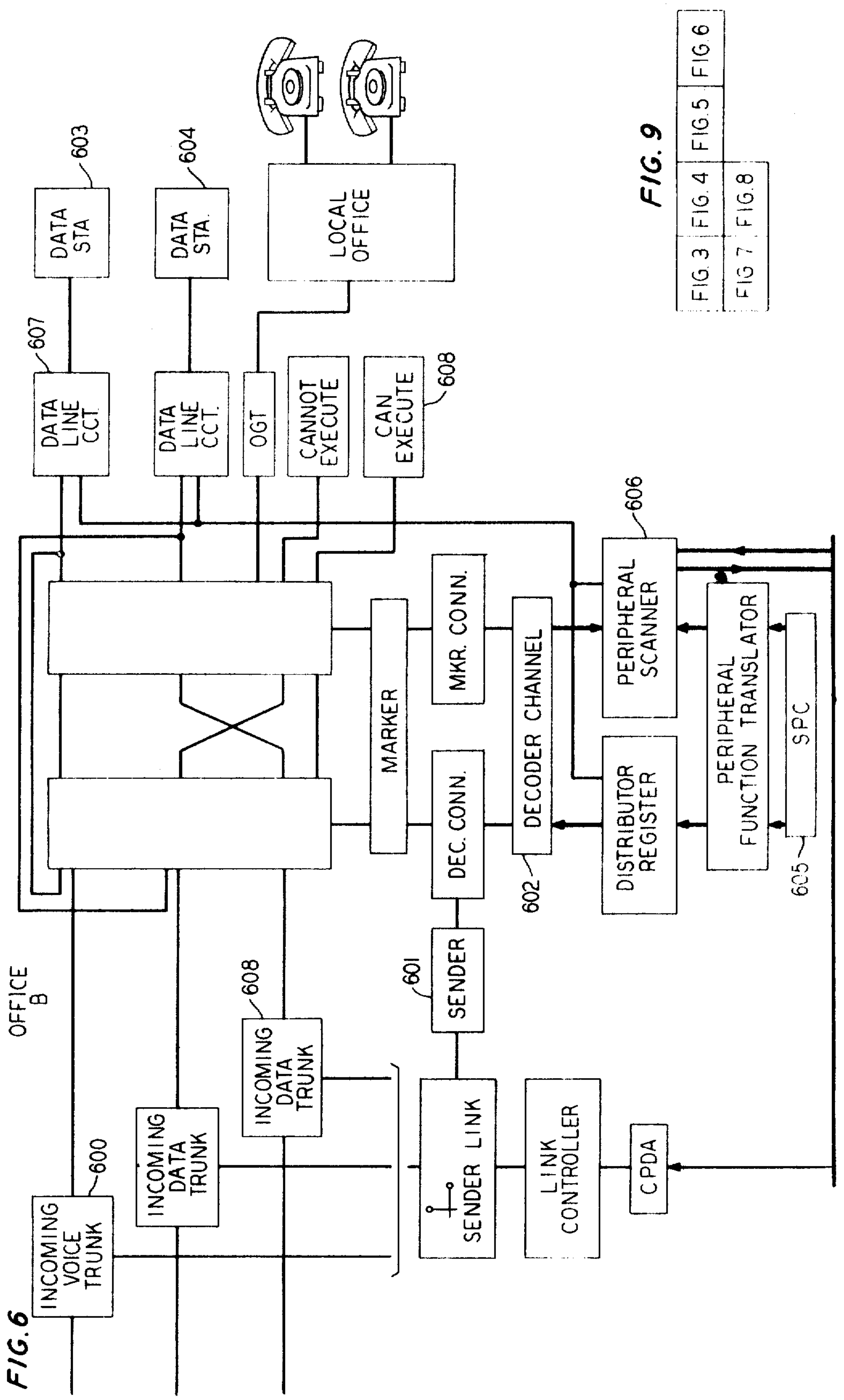
Figure 7:
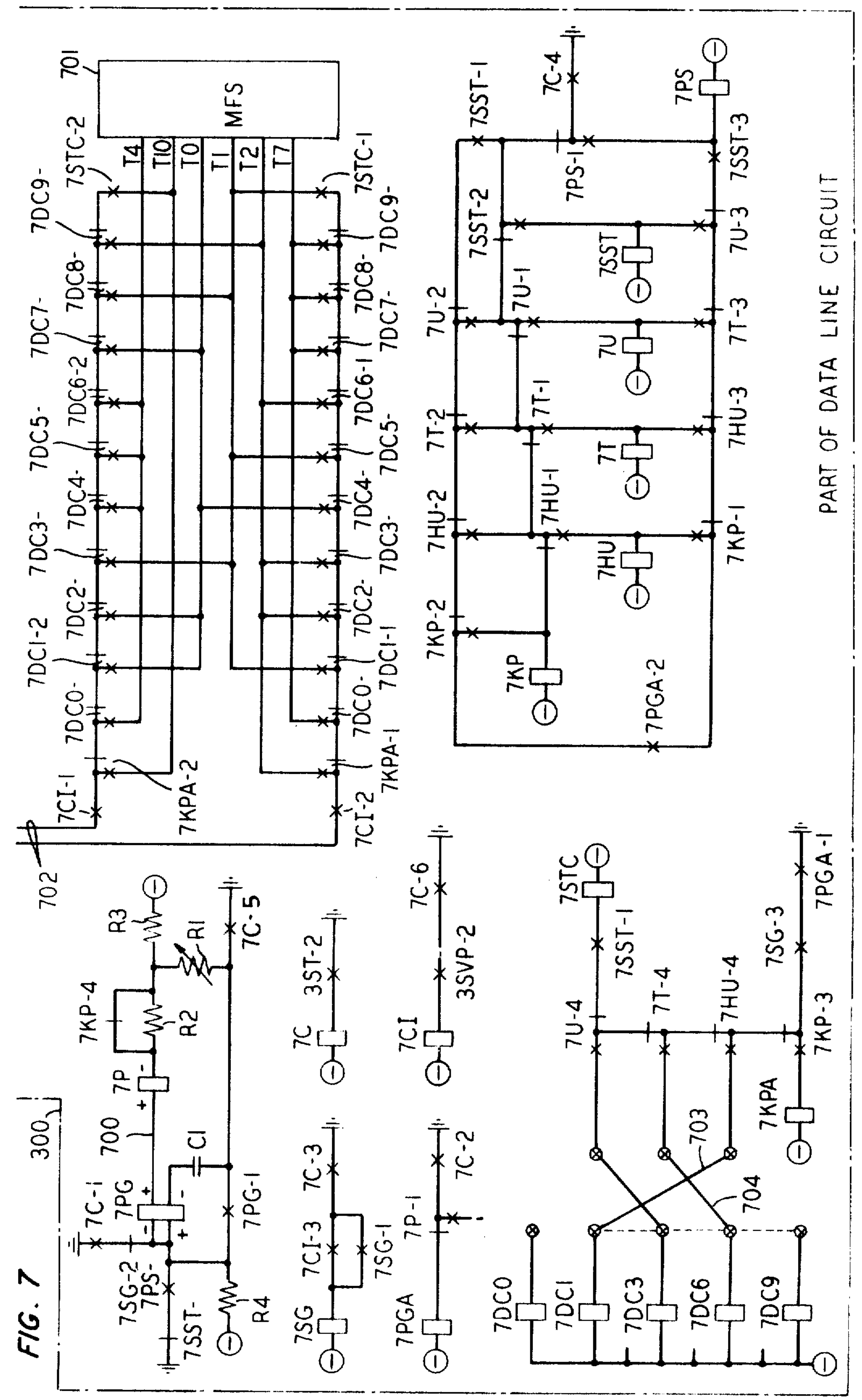
Figure 8:
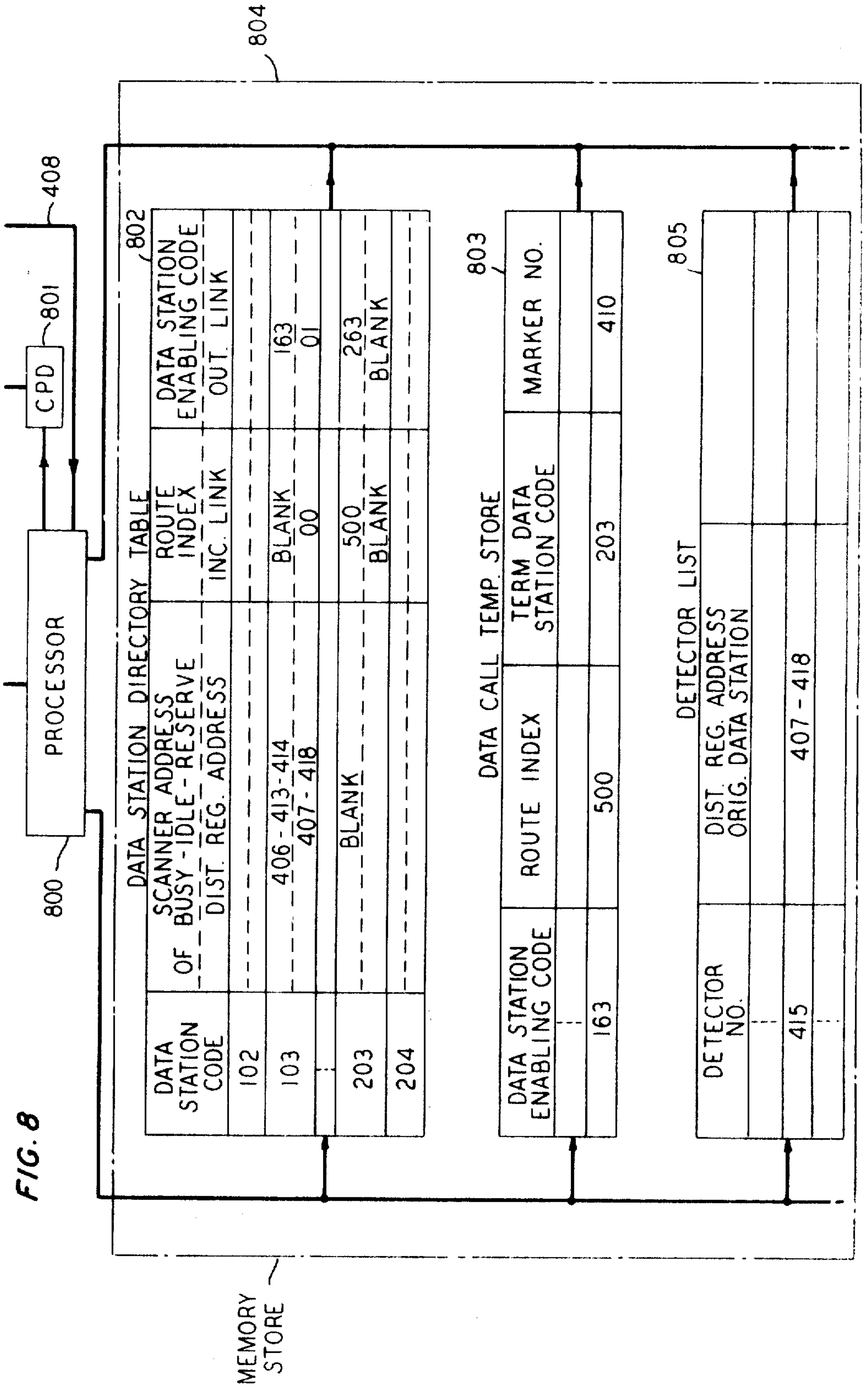

FIG. 3 shows local switching office 305 which serves conventional telephone stations such as 301 and 302. FIG. 3 also shows data stations 303 and 304 and a portion of their associated data line circuits 300 and 306. FIG. 7 shows a pulse generator and related equipment which is part of data line circuit 300, while FIGS. 4, 5 and 8 show part of the toll switching office A which serves data stations and intertoll telephone calls. FIG. 6 shows, in block diagram form, toll switching office B which is similar to office A.

As described above, data stations are connected directly to centralized toll switching offices since these offices are quipped with wide band switching facilities. Connections between data stations, however, can be ordered up from any convenient telephone station.

To illustrate how the arrangement operates, a call will be described wherein telephone station 301 is used to order up a connection between data stations 303 (FIG. 3) and 603 (FIG. 6). When a customer at telephone station 301 wishes to order up a data connection, he lifts the telephone receiver at station 301 and dials the data call code plus the code assigned to each data station. In this example, it has been assumed that the data call code comprises the three digits 511 and the codes identifying data stations 303 and 603 are the three digit codes 103 and 203, respectively. Thus, to order up the desired connection the customer at station 301 dials the nine digits 511–103–203.

For purposes of discussion, the data stations codes for the two data stations being interconnected will be referred to as the originating data station code and the terminating data station code. It will be understood, however, that these terms are only being used to distinguish between the two data stations and that this does not infer that the data connection will be established in any particular direction.

The telephone switching equipment at local office 305 recognizes the three digital data call code and selects a voice frequency trunk to the nearest toll switching office A. Assuming that trunk 307 is selected, the incoming trunk equipment 400 (FIG. 4) is actuated to transmit a start signal to sender link frame 402. In response to the start signal, sender link frame 402 requests the service of link controller 403. Link controller 403 controls the connection of incoming trunks and senders on sender link frame 402. When an idle sender such as 401 is selected, link controller 403 signals over conductors 405 to peripheral scanner 406 to request service by the stored program control system shown in FIG. 8.

The stored program control system in FIG. 8 can be any one of the many types of electronic data processors such as a system shown in the copending application of C. J. Funk et al. Ser. No. 784,615 filed Dec. 18, 1968 or the system disclosed in the Bell System Technical Journal, Vol. XLIII, No. 5, Sept. 1964.

Briefly, the stored program control system is a high-speed data processing facility which performs call processing functions such as route translation for the other units of control equipment in the switching office. The stored program control system can be divided functionally into a processor 800, a central pulse distributor 801, memory store 804, and maintenance units of equipment (not shown). The processor contains most of the logic and control circuitry for the stored program control system. It controls the system by executing a sequence of instructions which are stored in the memory store. In addition to carrying out arithmetic instructions such as adding and subtracting, the processor can shift, rotate and perform logical operations such as AND, OR, etc. The memory store 804 is an electrically alterable memory and is used as a permanent store for programs and as a temporary store for call processing data.

Information is transmitted between the stored program control system and other equipment units via buffer circuits. The input buffer for the stored program control system is the peripheral scanner 406 which comprises a plurality of current-sensitive devices called ferrods. These ferrods are connected to the conductors being scanned. Under control of the processor, this scanner is addressed causing certain of these ferrod devices to be read. The information read out of the peripheral scanner 406 is transmitted to the processor over scanner answer bus 408. An example of a typical scanner suitable for use in the arrangement is disclosed in U.S. Pat. No. 3,254,157 to A. M. Guercio et al. of May 31, 1°66.

The output buffer for the store program control system is distributor register 407, which comprises a plurality of bistable devices actuated by processor 800 for transmitting direct current signals to equipment units such as the decoder channel 409, marker 410, etc.

Peripheral function translator 411 is interposed between the buffer circuits 406 and 407 and the processor. The peripheral function translator is used to convert the binary language of the store program control system into language that can be used by the buffer circuits. For example, a group of sensing devices in peripheral scanner 406 is located through the use of two addresses each represented in a one-out-of-eight code. Peripheral function translator 411, therefore, converts a 20-bit binary output of the processor into the proper one-out-of-eight codes for addressing scanner 406.

Periodically processor 800 directs peripheral scanner 406 to interrogate certain sensing devices to look for service requests. When the processor detects a service request from link controller 403, it interrogates other ferrod sensing devices associated with that link control to ascertain the identity of incoming trunk 400 and sender 401. This information is put in a temporary portion of store 804 for use during a later stage of the call. Once this information is stored, processor 800 signals link controller 403 via central pulse distributor applique 404 causing link control 403 to interconnect the incoming trunk requesting service with the selected idle sender. Sender 401 then signals over trunk 307 to local office 305 and the digits dialed by the customer at station 301 are pulsed forward to sender 401.

When sender 410 receives sufficient digits, it is connected through decoder connector 412 to an idle decoder channel such as decoder channel 409. Decoder channel 409 then energizes a bid ferrod in peripheral scanner 406 requesting the stored program control system to translate the digits received by sender 401. Processor 800 causes peripheral scanner 406 to read the sensing devices associated with decoder channel 409 and the nine digits received from local office 305 are forwarded to the processor.

The three digit data call code 511 informs processor 800 that this is a telephone call which is ordering up a data connection between two data stations identified by the last six digits received. The processor then consults its data station directory table 802 in memory to ascertain if one or both of the data stations are served by office A.

The data station directory table is an allocated portion of memory 804 which lists the identifying codes for the data stations. A processor takes the originating data station code 103 and compares it with each entry in the table until a match is found. From this table, the processor can determine whether or not the data station is served by office A or another office. For example, on the first line adjacent to the left column in the table which lists the data station codes is the scanner location of sensing devices which enable the processor to test those data stations served by office A for busy, idle or reserve. For data stations served by another office there would be no entry in this column. The next entry in the table will give the processor the route index for data stations served by another toll office and there would be no information entered in this column for data stations served by office A. The last column in the table gives the processor the data station enabling code which is outpulsed by the data station to establish the data connection.

Indexing in the data station directory table 802 to the originating data station code 103 the processor ascertains the scanner location of ferrod sensors associated with data line circuit 300. The processor then addresses the scanner to determine the state of these devices. If the data line circuit 300 is busy or already reserved for another data call, an appropriate tone will be returned over the voice connection to the customer at telephone station 301 who ordered up the connection. If data station 303 is busy, ground is extended from data line circuit 300 over conductor 308 to peripheral scanner 406 to energize ferrod 414. On the other hand, if data station 303 is reserved for another data call, ground is extended over conductor 309 in data line circuit 306 to energize a different ferrod 413 in peripheral scanner 406. When the data station 303 is idle both of these ferrods are deenergized.

Let it be assumed that data station 303 is idle. The processor consults table 802 to determine the distributor register address of data station 303. Processor 800 then addresses distributor register 407 and actuates contact 425 to transmit ground over conductor 310 to operate station reserve relay 3RS. Relay 3RS locks over an obvious circuit, and, at its contacts, 3RS-2 transmits ground to the peripheral scanner 406 indicating that the data line circuit is now reserved.

Having utilized the originating data station code 103, processor 800 searches the data station directory table 802 and uses the terminating data station code 203 to ascertain if the terminating data station is served by office A. From table 802 the processor determines that the data station identified by code 203 is served by a distant office and that this office can be reached over a trunk route identified by the route index entry in the table. The processor now determines whether or not data trunks are available in the route identified by the route index.

The routing scheme used herein is similar to other routing schemes, that is, the route index will direct the processor to other tables in the store 804 which contain the information necessary for testing data trunks in a particular route. No connections will be established to a data trunk at this time. The processor will, nevertheless, take the necessary action to assure that a data-trunk will be available when the data connection is subsequently established. The processor can perform this function in different ways. For example, the processor might, through the use of scanner 406 and marker 410, select a particular data trunk and reserve that trunk so that the trunk cannot be used for other calls. The processor would identify the trunk that was reserved and enter its identity in a temporary store for subsequent use when the data connection is to be established.

In the alternative, a statistical analysis of the trunk route could be taken to ascertain if sufficient trunks are available to assure a subsequent data connection even if a particular trunk is not reserved for the connection. With this latter arrangement, each trunk route would be assigned a value designated the "threshold of all trunks busy." This value would be predetermined using well known traffic engineering techniques and would indicate the probability of successfully finding an idle trunk within a predetermined interval after first testing the trunk group. More specifically, assume it were determined from traffic study that a trunk route had a threshold value of 5. If five or more trunks in that data route are found idle during the processing of the telephone call, this would indicate to the processor that there would probably be an idle trunk available when the data connection is subsequently established. On the other hand, if less than five data trunks were available during the processing of the telephone call, then this would indicate to the processor that it is unlikely that any trunks would be available when an attempt is made subsequently to process the data call. In the later case a "can not" execute tone would be returned to the telephone station which is ordering up the data connection.

Returning now to the description of the data call, let it be assumed that sufficient trunks are available for the data connection. The processor now determines the enabling code for the originating data station by consulting data station directory table 802. Each data station is assigned a distinctive enabling code which will be outpulsed by the data station to establish the data channel between the selected data stations. The enabling code for data station 303 is the three digit code 163. Processor 800 now makes an entry in the data call temporary store 803 in a portion of memory identified by the originating data station enabling code 163. This entry would comprise the route index associated with the route having available wide band channels to the toll office serving the terminating data station.

Having stored sufficient information for processing the data connection, processor 800 and marker 410 now complete the telephone connection. Route selection for the telephone call is done in the same manner by translating the terminating station code into route index associated with trunks to the office serving the terminating data station. For the voice frequency telephone call, however, wide band facilities are not required and this call may be routed over a lower grade voice frequency facility. This facility should, nevertheless, be equipped with a detector responsive to a "can execute" signal which is received from the office serving the terminating data station after all switching offices have been prepared for establishing the data connection. In addition, the data call code 511 is converted to a data progress code 611. The data progress code informs the toll offices receiving this code that one of the data stations in the network has been located by the telephone call progressing through the network and that data trunk testing should take place to prepare each toll office for the wide band call. If a toll office receives the data call code 511, this informs the toll office that, prior to reaching this office, the telephone progressed through an office which served neither data station. Data trunk testing need not take place when an office receives the data call code unless one of the data stations is served by that office receiving the code.

Processor 800 now distributes via distributor register 407 call routing information to decoder channel 409 and marker 410. This information includes the location of the outgoing voice trunks to be tested for use in a telephone call. In addition, the digits to be outpulsed over a trunk to office B are forwarded to sender 401. These digits comprise the data progress code 611, the originating station enabling code 163, and the terminating data station address code 203.

While the marker is testing and selecting the outgoing voice trunks, the marker identifies the incoming line frame on which incoming voice trunk 400 appears. The method and arrangement for identifying the incoming frame are set forth in the aforementioned Gooderham et al. patent and need not be described herein.

Control over the telephone call is now turned over to marker 410 which proceeds to test and select an outgoing voice trunk having a tone detector associated therewith. When the marker selects an idle outgoing trunk, it identifies the trunk and transmits the marker identity and the identity of the detector associated with the selector trunk over conductors 418 to ferrod sensors in peripheral scanner 406. Processor 800 periodically causes a scanner to look at these ferrods to determine if a marker is requesting service by the processor. Upon detecting a request for service by marker 410, processor 800 consults the data call temporary store 803 and the data station directory table 802 to ascertain the data stations involved in the telephone call being processed by the marker. In the call being processed by marker 410, a data connection was ordered up between data stations identified by codes 103 and 203. From table 802 the processor can also determine the distributor register address associated with the originating data station 103. The distributor register address is then entered in the detector list 805 under the appropriate detector associated with the voice trunk selected by the marker.

When marker 410 selects an idle outgoing voice trunk such as trunk 501, it connects this trunk to incoming trunk 400 over a channel on network link frame ILA and OLA. A sender 601 is attached to the incoming trunk 600 at office B in the same manner as previously described with respect to the sender operation at office A. When sender 601 is attached, sender 401 outpulses the nine digits 611-163-203. After sufficient digits have been stored in sender 601, sender 601 seizes an idle decoder channel 602 which transmits a translation request to store program control system 605. The store program control system 605 has not been shown in detail to simplify the drawing. It will be understood that this system is similar to the system at office A, (see FIG. 8).

The processor at office B recognizes the data progress code 611 and using the last three digits received 203 interrogates a data station directory table similar to table 802. From this table, the processor learns the location in scanner 606 of the ferrods associated with data station 603. The processor at office B directs the scanner to these ferrods to determine if data station 603 is busy, idle, or reserved for another data call. Assuming that data station 603 is idle, the processor will place this data station on reserve in the same manner that data station 303 was reserved at office A. The processor at office B now makes in entry in its data call temporary store associated with the originating data station enable code. This entry indicates the terminating data station to be interconnected to the incoming data trunk when the data call is established.

Having reserved the terminating data station 603, the processor at office B now interconnects the incoming voice trunk 600 with a "can execute" tone source 608. Tone source 608 provides a special tone which is transmitted back over the telephone connection to the originating station to inform the customer at station 301 that the connection which was ordered up can now be completed. In addition, the tone on trunk 500 is detected by detector 415 and causes the operation of detector relay 4DET. Relay 4DET in operating closes its contacts 4DET-1 to extend ground over conductor 416 to saturate ferrod 417 in peripheral scanner 406.

Periodically, scanner 406 interrogates the bid ferrods associated with detector circuits. When a change of state occurs on one of these ferrods, the ferrod is identified and the processor interrogates the detector list 805 to determine the distributor register location of the originating data station.

Using the distributor register address of the originating data station, processor 800 causes certain contacts in distributor register 407 to be actuated. More specifically, contact 419 is actuated, transmitting ground over conductor 311 to FIG. 3 and over conductor 313 to operate relay 3S. Relay 3S locks through its own contacts 3S-1 and contacts RLS-1 of release relay RLS. At its contacts 3S-3, relay 3S opens a locking circuit for relay 3RS which releases. When relay 3S is operated, data line circuit 300 is made busy and the release of relay 3RS removes the reserve condition from data line circuit 300.

Distributor register 407 also connects ground over conductor 312 via contacts 428 to operate start relay 3ST and data line circuit 300. Relay 3ST in operating begins a sequence of operations which result in the transmittal of the originating data station enabling code 163 and the establishment of the data connection. At its contacts, 3ST-1 (FIG. 3) a path is closed for operating link controlling relay 3LC. In operating, relay 3LC extends ground over start lead 314 to sender link 402 and link controller 403 to request that an idle sender such as sender 401 be attached to data line circuit 300 via sender link 402. The interconnection of an idle sender with the data line circuit is similar to the interconnection of a sender with an incoming trunk as described above.

Relay 3ST, in operating, also closes its contacts 3ST-2 in FIG. 7 to complete an obvious operating circuit for relay 7C. When relay 7C operates, it closes its contacts 7C-4 in FIG. 7 to operate relay 7KP. This circuit includes battery through the winding of relay 7KP, break contacts 7HU-1, 7I-1, 7U-1, 7SST-2 and 7PS-1 and make contacts 7C-4 to ground. Relay 7C also closes its contacts 7C-1 in FIG. 7 to extend ground through break contacts 7SG-2, the upper winding of relay 7PG, over conductor 700 and through the winding of relay 7P and resistance R2 and R3 to negative battery. Relay 7P operates in the circuit but the current through the upper winding of relay 7PG is in the direction to bias relay 7PG in its unoperated state.

With relays 7P and 7KP operated, the data line circuit 300 is prepared to outpulse the data station enabling code as soon as a sender is attached to the data line at office A. When sender 401 is attached to data line circuit 300 via sender link 402, a start dial signal is transmitted by the sender to the data line circuit. This signal is detected by the operation of relay 3SVP in the data line circuit. Relay 3SVP, in operating, closes its contacts 3SVP-1 to transmit battery over conductor M to data station 303 to prepare the data station for transmitting data. Relay 3SVP also closes its contacts 3SVP-2 in FIG. 7 to provide an obvious operating circuit for cut-in relay 7CI. With cut-in relay 7CI operated, a path is prepared for interconnecting the transmission conductors of data line circuit 300 with multifrequency supply 701. Multifrequency supply 701 comprises a plurality of tone generators for supplying six different frequencies. Depending on which of the relays 7KPA, 7STC, and 7DCO-7DC9 is operated, combinations of two frequencies will be transmitted over conductors 702 to FIG. 3 and over conductors 315 via sender link 402 to sender 401. The windings of relays 7DC0-7DC9 are selectively connected to contacts of steering relays 7HU, 7T, and 7U, and, depending upon which 7DC relay is operated, tones representing a corresponding digit will be transmitted by the data line circuit. In the example being described, the digits 163 will be sent in sequence by cross connecting the winding of relay 7DC1 to contacts of hundreds relay 7HU, the winding of relay 7D6 to contacts of tens relay 7T, and the winding of relay 7DC3 to contacts of units relay 7U.

Relay 7C1 also closes its contacts 7CI-3 in FIG. 7 to complete the operating path for start generator relay 7SG. Start generator relay 7SG locks through its own contacts 7SG-1 independently of cut-in relay 7CI. When relay 7SG operates, it opens its contacts 7SG-2 in FIG. 7 to remove ground from the left side of both windings of relay 7PG and interrupt the operating circuit for relay 7P. At this time, a circuit is completed from negative battery through resistance R4, through the upper winding of relay 7PG in the operate direction, over conductor 700, through the winding of relay 7P in the nonoperate direction and through resistances R2 and R1 to ground at contacts 7C-5. Relay 7P releases at this time. Negative battery connected to resistance R4 is also extended through the lower winding of relay 7PG in the nonoperate direction to one side of capacitor C1. Current flowing in the upper winding of relay 7PG tends to operate this relay and current flowing in the lower winding of relay 7PG during time capacitor C1 is charging prevents relay 7PG from operating for a predetermined interval until capacitor C1 is substantially charged.

When relay 7P releases, a circuit is completed for operating relay 7PGA. This circuit includes make contacts 7C-2, break contacts 7P-1 and the winding of relay 7PGA. Relay 7PGA in operating closes its contacts 7PGA-1 to extend ground through make contacts 7SG-3 and 7KP-3 and through the winding of relay 7KPA to battery. Relay 7KPA operates and connects the tones on conductors T2 and T10 from multifrequency supply 701 to conductors 702. This combination of tones is called the "keypulse" tone and is received by sender 401 at office A and prepares the sender for receiving the originating data station enabling code 163.

When relay 7PGA operates, it completes a path for operating hundreds relay 7HU. This path includes battery through the winding of relay 7HU, make contacts 7KP-1, and 7PGA-2, break contacts 7KP-2 7HU-2, 7T-2 and 7U-2, make contacts 7SST-1, break contacts 7PS-1 to ground on make contacts 7C-4.

At the end of the interval determined by the charging of capacitor C1, relay 7PG operates and closes its contacts 7PG-1 to connect negative batte y through resistances R4, R1, and R2 to the right side of the winding of relay 7P. The potential on the right side of this winding becomes more negative and relay 7P operates. Contacts 7PG-1 also short circuit the lower winding of relay 7PG and capacitor C1 to begin the release of relay 7PG. The release of relay 7PG is timed by the discharge of capacitor C1.

When relay 7P operates, it releases relay 7PGA and relay 7PGA releases relays 7KP and 7KPA. Relay 7KPA, in releasing, removes the keypulse tones T2 and T10 from conductors 702.

At the end of the timed release interval of relay 7PG, relay 7PG releases once again reversing the current flow through relay 7P and relay 7P releases. Relay 7P in releasing reoperates relay 7PGA. At its contacts 7PGA-1 relay 7PGA extends ground through make contacts , break contacts 7KP-3, make contacts 7HU-4 over cross connection 703 and through the winding of relay 7DC1 to battery operating relay 7DC1. At its contacts 7DCH-1 and 7DC-2 relay 7DC1 connects tones TO and T1 to conductors 702, thereby transmitting the digit 1 from data line circuit 300 to sender 401.

Relay 7PGA, in operating, also closes its contacts 7PGA-2 in FIG. 7 to operate tens relay 7T in preparation for transmitting the next set of tones. This circuit can be traced from battery through the winding of relay 7T, make contacts 7HU–3, break contacts 7KP–1, make contacts 7PGA–2, break contacts 7KP–, make contacts 7HU–2, break contacts 7T–1, 7U–1, 7SST–2, and 7PS–1, and through make contacts 7C–to ground. Relay 7T locks through its own make contacts 7T–1 and break contacts 7U–1 7SST–2 and 7PS–1 to ground to contacts 7C–1.

When relay 7PG releases, removing the short circuit from around capacitor C1, capacitor C1 once again begins to charge and, when capacitor C1 is substantially charged, relay 7PG reoperates. With relay 7PG operated, relay 7P operates causing relay 7PGA to release. Relay 7PGA, in releasing, releases relay 7HU and 7DC1 to terminate the transmission of tones T0 and T1.

In operating, relay 7PG short circuits its lower winding and discharges capacitor C1 through that winding. Relay 7PG now begins to release, as described above, and when relay 7PG releases, relay 7P operates to release relay 7PGA. With relay 7PGA operated and tens relay 7T operated, a circuit is completed for operating relay 7DC6. This circuit includes ground through make contacts 7PGA–1 and 7SG–3, break contacts 7HU–4, make contacts 7T–4, cross-connection 704, and through the winding of relay 7DC6 to battery. Relay 7DC6, at its contacts 7DC6–1 and 7DC6–2, connects the tones on conductors T2 and T4 to conductors 702 and over the transmission conductors of the data line to sender 401, thereby transmitting the digit 6 to office A.

When relay 7PGA operates, it also completes a circuit for operating units relay 7U in preparation for transmitting the units digit of the data station enabling code.

Thus, with each operation and release of the pulse generator relay 7P and 7PG, a set of multifrequency signals is transmitted to the sender at office A. These signals comprise a keypulse signal which prepares the sender for operation, the three digits of the originating data station enabling code 163, and a start pulse. The start pulse comprises the tones T10 and T1 which are transmitted when relay 7STC operates. The start pulse signals sender 401 to proceed with digit translation since no other digits will be transmitted by the data line circuit 300.

At the last operation of relay 7PGA, which operated relay 7STC to transmit the start pulse tones, relay 7PGA also completed a path for operating relay 7PS. This circuit includes battery through the winding of relays 7PS, make contacts 7SST–3, and break contacts 7U–3, 7T–3, 7HU–3, and 7KP–1, make contacts 7PGA–2, break contacts 7KP–2, 7HU–2, 7T–2, and 7U–2, make contacts 7SST–1 break contacts 7PS–1, and through make contacts 7C–4 to ground. Relay 7PS, in operating, opens its contacts 7PS–4 in FIG. 3 to interrupt the locking circuit for start relay 3ST. Relay 3ST releases to begin the release of the pulse generator circuitry in data line circuit 300. When relay 7P operates during the transmission of the last pulse, relay 7PGA releases releasing relays 7SST and 7STC. With relay 7SST released and relay 7PS operated, ground is connected to the left side of both windings of relay 7PG to prevent this relay from operating. In the meantime, relay 3ST releases relay 7C and relay 7C releases relays 7Cl, 7P, and 7SG.

A toll switching office A when sender 401 receives a start pulse, it seizes an idle decoder channel, such as 409, through decoder connector 412. Decoder channel 409 then saturates a bid ferrod requesting a translation from the stored program control system in office A. Recognizing the translation request, processor 800 scans ferrods associated with decoder channel 409 to ascertain the digits received by sender 401. Using the digits 163 from the sender, the processor now consults the data call temporary store 803 to determine the routing of the call. From this table, the processor determines the route index of the route which was priorly tested during the telephone call to determine if sufficient trunks were available for the data connection. The processor distributes this information to decoder channel 409 and marker 41 so that marker 410 can proceed to test and select an idle trunk using trunk block and connector 420.

Processor 800 also distributes to sender 401 the digits to be outpulsed to the next office, office B. In this example, the sender will outpulse the originating data station enabling code 163 and the terminating data station code 203.

Assuming that outgoing data trunk 500 is idle, marker 410 seizes this trunk and prepares to interconnect this trunk with the originating data line circuit using incoming and outgoing links ILA and OLA. The incoming link appearance of data line circuit 300 is identified and marker 410 selects an idle channel on links ILA and OLA. When outgoing data trunk 500 is seized, a signal is sent over the trunk conductors to office B to cause a sender to be attached to the incoming trunk equipment 608 at that office. Once a sender is attached, sender 401 at office A can outpulse the digits 163–203 to office B.

When the sender at office B receives sufficient digits, it requests a digit translation by stored program control system 605. By looking under the originating data station enabling code 163 in the data call temporary store at that office, the processor determines that the incoming trunk over which the digits were received should be connected to the data station whose address code is 203. Using the data station directory table, the processor at office B can ascertain the outgoing link appearance of data station 603. The processor at office B now removes the reserved condition from the data line circuit 607 and makes this circuit busy. A channel now can be established between incoming data trunk 608 and data line circuit 607.

This completes the data connection between the two data stations 303 in FIG. 3 and 603 in FIG. 6. The data stations now exchange supervisory signals over the data channel and proceed to transmit data to each other. The release of data connection is placed under control of the data stations and, when data transmission is completed, the data channel is released.

It is understood that the above-described arrangements are merely illustrative of the application and principles of the invention. Numerous other arrangements may be devised by those skilled in the art without departing from the spirit and scope of the invention. For example, instead of outpulsing its enabling code to the switching center serving the data station, that switching office might interconnect the originating data station with a trunk in the appropriate route and cause the data station to outpulse its enabling code to the next switching center.

What I claim is:

1. In combination a switching network comprising a plurality of switching centers interconnected by special communication links, a plurality of data stations each identified by a corresponding address code and coupled to a terminal at one of said switching centers, a plurality of local offices each having telephone stations connected thereto, regular communications links coupling said local offices with said network, and means controlled by any calling one of said telephone stations for ordering the establishment of special link connections between any selected ones of said data stations.

2. The invention defined in claim 1 wherein said ordering means comprises means responsive to the receipt of address code signals from a calling one of said telephone stations for interrogating said network to ascertain the terminal locations of the selected data stations corresponding to said address code signals and control means for causing said switching centers to interconnect said selected data stations over said special inks independently of said calling telephone station.

3. The invention defined in claim 2 wherein said interrogating means comprises a memory store at each said switching center for recording the idle-busy status of data stations coupled to said center, means for reserving idle ones of said selected data stations, and means for determining the availability of said special links.

4. The invention defined in claim 3 wherein said ordering means also comprises signaling means effective when said selected data stations are reserved for transmitting an execute signal to said one calling telephone station to inform the customer thereat that the ordered connection can be established.

5. The invention defined in claim 4 wherein each said data station comprises means for sending an enabling code to its associated switching center, and said ordering means also comprises means for enabling the sending means of one of said selected data stations.

6. A communications system comprising a plurality of switching centers; a plurality of data stations coupled to said switching centers and each including means for transmitting a coded signal; a plurality of telephone stations; and a arrangement actuated by a calling one of said telephone stations for interconnecting selected data stations comprising, control means responsive to address signals from said calling telephone station for extending a voice connection between said calling telephone station and switching centers coupled to each selected data station, means effective when said voice connection is established for signaling said calling telephone station, means at one of said switching centers controlled by said signaling means for actuating the transmitting means associated with one of said selected data stations, and means at said switching centers responsive to a coded signal from said actuated transmitting means for interconnecting said selected data stations.

7. The invention defined in claim 6 further comprising a plurality of communication links interconnecting said switching centers, and wherein said voice connection includes a particular one of said links and said actuating means includes a detector means coupled to said particular link and responsive to said signaling means.

8. The invention defined in claim 7 wherein said control means comprises means for designating certain of said links for interconnecting said selected data stations and means for registering said designated links at said switching centers and wherein said interconnecting means includes means for interrogating said register means.

9. A communication system comprising first and second switching centers; a plurality of data stations connected to said centers and each including means effective when enabled for sending a discrete signal to its associated switching center; a plurality of communication links interconnecting said centers; and a plurality of telephone stations comprising means for transmitting to said centers a plurality of command signals including address signals corresponding to first and second data stations; said first center comprising first test means responsive to a first address signal from a calling one of said telephone stations for ascertaining the availability of the corresponding first data station, means responsive to a second address signal from said calling telephone station for identifying available ones of said links, means for extending a first connection between said calling station and said centers, means for storing the identity of said available links in a register associated with said first data station, and means for forwarding said second address signal over said first connection to said second center; said second center comprising second test means responsive to said second address signal for determining the availability of said second data station and means responsive to said determining means for transmitting an execute signal over said first connection to said first center and to said calling telephone station, said first center further comprising means responsive to said execute signal for enabling said first data station sending means; and means at said centers responsive to said discrete signal sent by said first data station for interconnecting said first and second data stations.

10. The invention defined in claim 9 wherein said command signals transmitted by said calling telephone station include a first control signal indicating that said first and second data stations have not been tested for availability and said forwarding means includes means for changing said first control signal to a second control signal to inform said second center that said first data station is available.